United States Patent [19]

Canzek

[11] Patent Number: 4,738,496
[45] Date of Patent: Apr. 19, 1988

[54] HIGH SPEED INFRARED WIDE ANGLE LENS SYSTEM

[76] Inventor: Ludvik Canzek, Quellmattstrasse 3, 5035 Unterentfelden, Switzerland

[21] Appl. No.: 839,282

[22] Filed: Mar. 13, 1986

[30] Foreign Application Priority Data

Mar. 19, 1985 [CH] Switzerland .................. 01207/85

[51] Int. Cl.⁴ .......................... G02B 13/14; G02B 9/00
[52] U.S. Cl. ...................... 350/1.3; 350/465
[58] Field of Search .................. 350/1.3, 1.4, 418, 465, 350/469

[56] References Cited

U.S. PATENT DOCUMENTS

| | | | |
|---|---|---|---|
| 3,586,419 | 6/1971 | Wakimoto | 350/418 |
| 4,046,460 | 9/1977 | Koizumi | 350/465 |
| 4,380,363 | 4/1983 | Fjeldsted | 350/1.3 |
| 4,484,802 | 11/1984 | Kikuchi | 350/469 |
| 4,600,265 | 7/1986 | Norrie | 350/1.3 |
| 4,673,259 | 6/1987 | Kawamura | 350/465 |

*Primary Examiner*—John K. Corbin
*Assistant Examiner*—Martin Lerner
*Attorney, Agent, or Firm*—Werner W. Kleeman

[57] ABSTRACT

There is disclosed an objective or compound lens with high speed and large field angle for applications using infrared radiation. Preferred embodiments of the lens system have a useful spectral bandpass in the 2-2.5 $\mu$m and 1.5-2.5 $\mu$m region. These embodiments are constructed to have low resolution, a speed up to F/0.7 and a total field angle up to 60 degrees. Two embodiments comprise only 4 spherical lenses. By simple calculations the disclosed objectives or compound lenses may be matched to lens materials for use within other ranges of the infrared spectrum as well.

8 Claims, 1 Drawing Sheet

HIGH SPEED INFRARED WIDE ANGLE LENS SYSTEM

BACKGROUND OF THE INVENTION

The present invention broadly relates to optical lenses and, more specifically, pertains to a new and improved construction of a high speed infrared wide angle lens system.

Generally speaking, the lens system of the present invention comprises a high speed infrared wide angle lens system having a predeterminate focal length f and comprising an object side section, a middle section and a section on the image side.

Known infrared objectives are either high speed with a small field angle or low speed with a larger field angle. From German Patent Publication No. 2,519,961, published Nov. 20, 1975, there is known an objective with a speed of F/1.5 and a total field angle of 8 degrees. Another objective, known from German Patent Publication No. 1,472,189, published Jan. 9, 1969, has a total field angle of 25 degrees but a speed of only F/1.9, wherein F represents the lens speed of the system.

SUMMARY OF THE INVENTION

Therefore, with the foregoing in mind, it is a primary object of the present invention to provide a new and improved construction of a high speed infrared wide angle lens system which does not exhibit the aforementioned drawbacks and shortcomings of the prior art constructions.

A further object of the present invention is to provide an infrared lens system that is both high speed and wide angle in nature.

Yet a further significant object of the present invention aims at providing a new and improved construction of a lens system of the character described which is relatively simple in construction and design as well as extremely economical to manufacture.

Now in order to implement these and still further objects of the invention, which will become more readily apparent as the description proceeds, the lens system of the present invention is manifested by the features that it comprises a high speed infrared wide angle lens system with a focal length f comprising an object side section, a middle section and a section on the image side, wherein the object side section comprises at least one positive lens and one negative lens, the middle section comprises at least one positive lens and the section on the image side comprises at least one positive lens. The at least one positive lens and the one negative lens of the object side section are separated by an air lens. The air lens corresponds to the relation:

$$\frac{1-n}{R} + \frac{n'-1}{R'} < 0$$

wherein R refers to the radius of the object side surface of the air lens, n refers to the index of refraction in front of the object side front surface of the air lens, R' refers to the radius of the image side surface of the air lens and n' refers to the index of refraction behind the image side or rear surface of the air lens. The overall length of the high speed infrared wide angle lens system, i.e. the separation between the first and last surface of the lens system without the cover plate, is less than 3.1f.

BRIEF DESCRIPTION OF THE DRAWINGS

The invention will be better understood and objects other than those set forth above will become apparent when consideration is given to the following detailed description thereof. Such description makes reference to the annexed drawings wherein throughout the various figures of the drawings there have been generally used the same reference characters to denote the same or analogous components and wherein.

DETAILED DESCRIPTION OF THE PREFERRED EMBODIMENTS

Figure 1:
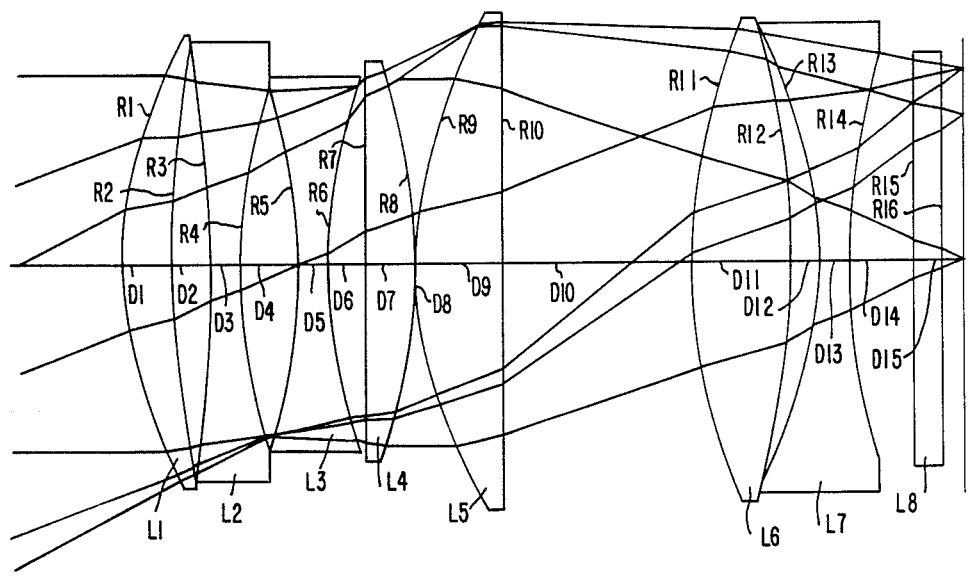
FIG. 1 is an infrared wide angle lens optical schematic section showing the lens elements of the high speed infrared wide angle lens system of the present invention.

Describing now the drawings, it is to be understood that to simplify the showing thereof only enough of the structure of the different embodiments of high speed infrared wide angle lens systems have been illustrated therein as is needed to enable one skilled in the art to readily understand the underlying principles and concepts of this invention. Turning now specifically to FIG. 1 of the drawings, there will be seen a schematic optical diagram of a high speed infrared wide angle lens system or compound lens according to the invention. It will be noted that an object side section comprises lenses L1, L2 and L3. The lenses L1 and L2 enclose an air lens with respective radii R2 and R3. A middle or center section comprises two lenses L4 and L5 and an image side section comprises two lenses L6 and L7. The reference character L8 denotes a cover plate. The cover plate L8 is not included in measurements of the overall length of the high speed infrared wide angle lens system.

Figure 2:
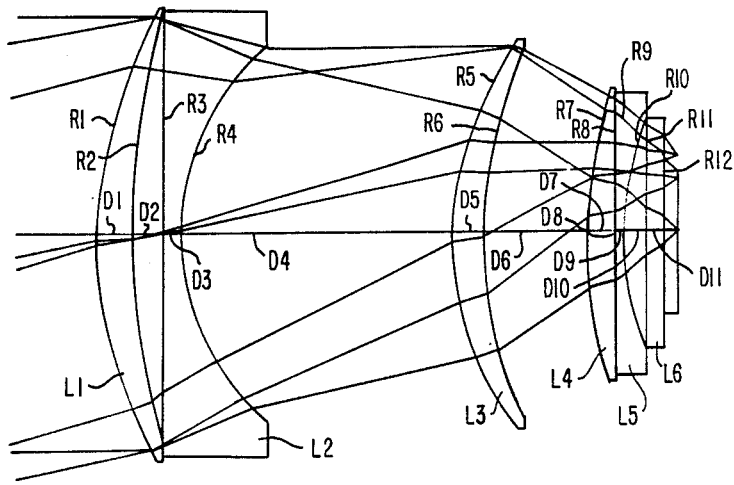
FIG. 2 is a view analogous to FIG. 1 for a second embodiment of the invention.
Figure 3:
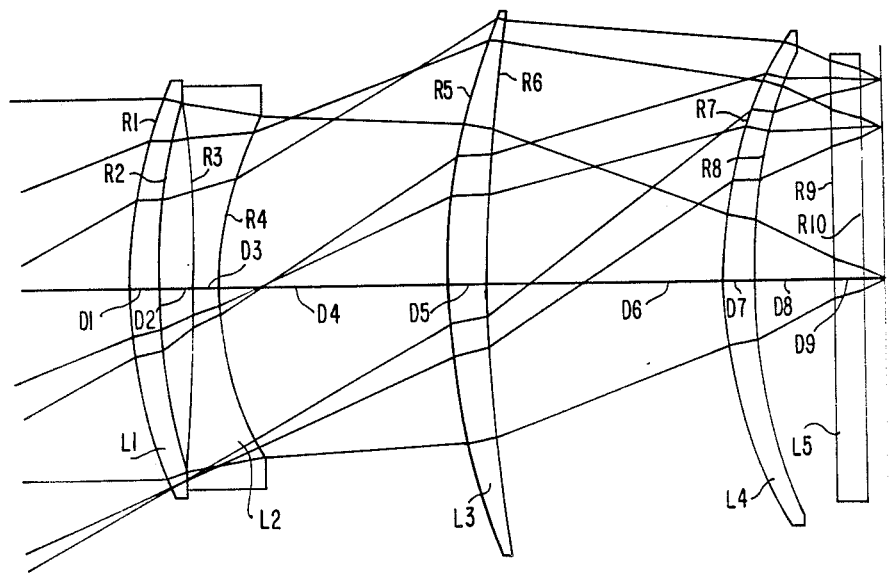
FIG. 3 is a view analogous to FIG. 1 for a third embodiment of the present invention.

If for one or more positive lenses an optical material is chosen with a relatively high index of refraction and Abbé number, the objective or compound lens system may be constructed with a much lesser number of lenses, as shown in FIG. 2 and FIG. 3, the design data of which are respectively tabulated in tables 2, 3, 4 and 5. The object side section of the embodiments shown in FIGS. 2 and 3 comprises only the two lenses L1 and L2 enclosing the air lens with the radii R2 and R3. The middle section has been reduced to the single lens L3. Objectives or compound lenses according to FIG. 3 comprise also an image side section with only one single lens L4.

The performance data of the preferred embodiments of the inventive lens system may be found in tables 1, 2, 3, 4 and 5, wherein f=focal length, F=lens speed, w=field angle and Index n=index of refraction.

The embodiments whose design data is tabulated in tables 1 to 5 have been corrected for the infrared wavelength ranges 2-2.5 μm and 1.5-2.5 μm respectively. Accordingly, also the materials of the lenses used for these embodiments are transparent and therefore have a useful spectral bandpass within such wavelength ranges. However, the various embodiments of the inventive lens system may easily be matched to lens materials transparent within other ranges of the infrared spectrum.

The state of correction and resolution of the objectives or compound lenses may be matched to the shape and structure of each radiation detector employed. The corresponding calculations for other lens materials and/or detectors lie within the compass of the optical art and do not involve any inventive step.

TABLE 1

For a wavelength of 2.3254 μm:
f = 100.0    F = 1:1.1    2w = 56 degrees

| Face No. | Radius R | Thickness D | Index n | Material |
|---|---|---|---|---|
| 1 | 106.07 | 12.0 | 1.7963 | IRG3 (Schott) |
| 2 | 313.83 | 9.1 | 1 | |
| 3 | −289.43 | 7.0 | 1.4329 | Quartz |
| 4 | 150.88 | 14.1 | 1 | |
| 5 | −128.55 | 6.5 | 1.4329 | Quartz |
| 6 | 130.71 | 9.0 | 1 | |
| 7 | 1886.94 | 12.0 | 1.7963 | IRG3 (Schott) |
| 8 | −154.77 | 0.2 | 1 | |
| 9 | 111.32 | 20.0 | 1.7963 | IRG3 (Schott) |
| 10 | ∞ | 45.1 | 1 | |
| 11 | 146.75 | 24.0 | 1.7963 | IRG3 (Schott) |
| 12 | −205.99 | 6.8 | 1 | |
| 13 | −111.58 | 7.6 | 1.4329 | Quartz |
| 14 | 199.37 | 14.7 | 1 | |
| 15 | ∞ | 6.4 | 1.4329 | Quartz |
| 16 | ∞ | | 1 | |

TABLE 2

For a wavelength of 2.2 μm:
f = 200.0    F = 1:1    2w = 60 degrees

| Face No. | Radius R | Thickness D | Index n | Material |
|---|---|---|---|---|
| 1 | 318.62 | 15.0 | 3.4462 | Silicon |
| 2 | 530.78 | 14.0 | 1 | |
| 3 | −1092.26 | 13.0 | 1.4350 | Quartz |
| 4 | 244.85 | 107.9 | 1 | |
| 5 | 331.46 | 16.6 | 3.4462 | Silicon |
| 6 | 606.32 | 103.5 | 1 | |
| 7 | 223.68 | 15.4 | 3.4462 | Silicon |
| 8 | 297.27 | 26.2 | 1 | |
| 9 | −3030.85 | 14.0 | 1.4350 | Quartz |
| 10 | 863.35 | 7.2 | 1 | |
| 11 | ∞ | 12.8 | 1.4350 | Quartz |
| 12 | ∞ | | 1 | |

TABLE 3

For a wavelength of 2.15 μm:
f = 200.0    F = 1:1    2w = 52 degrees

| Face No. | Radius R | Thickness D | Index n | Material |
|---|---|---|---|---|
| 1 | 240.54 | 14.0 | 3.4477 | Silicon |
| 2 | 372.70 | 24.3 | 1 | |
| 3 | −2632.24 | 13.0 | 1.4358 | Quartz |
| 4 | 150.37 | 84.1 | 1 | |
| 5 | 369.28 | 21.0 | 3.4477 | Silicon |
| 6 | 775.86 | 100.9 | 1 | |
| 7 | 260.93 | 15.5 | 3.4477 | Silicon |
| 8 | 387.46 | 35.2 | 1 | |
| 9 | ∞ | 12.8 | 1.4358 | Quartz |
| 10 | ∞ | | 1 | |

TABLE 4

For a wavelength of 2.15 μm:
f = 100.0    F = 1:0.7    2w = 30 degrees

| Face No. | Radius R | Thickness D | Index n | Material |
|---|---|---|---|---|
| 1 | 146.62 | 11.9 | 3.4477 | Silicon |
| 2 | 266.72 | 9.3 | 1 | |
| 3 | ∞ | 50 | 1.4358 | Quartz |
| 4 | 77.66 | 88.2 | 1 | |
| 5 | 100.84 | 10.4 | 3.4477 | Silicon |
| 6 | 142.54 | 34.8 | 1 | |
| 7 | 151.52 | 7.4 | 3.4477 | Silicon |
| 8 | 410.47 | 0.4 | 1 | |
| 9 | 473.67 | 5.0 | 1.4358 | Quartz |
| 10 | 113.31 | 6.3 | 1 | |
| 11 | ∞ | 5.0 | 1.4358 | Quartz |
| 12 | ∞ | | 1 | |

TABLE 5

For a wavelength of 2.2 μm:
f = 200.0    F = 1:0.7    2w = 40 degrees

| Face No. | Radius R | Thickness D | Index n | Material |
|---|---|---|---|---|
| 1 | 301.16 | 16.0 | 4.0875 | Germanium |
| 2 | 436.75 | 26.7 | 1 | |
| 3 | −2358.79 | 16.0 | 1.4350 | Quartz |
| 4 | 210.08 | 126.8 | 1 | |
| 5 | 244.25 | 16.0 | 4.0875 | Germanium |
| 6 | 341.43 | 89.1 | 1 | |
| 7 | 200.0 | 15.0 | 3.4462 | Silicon |
| 8 | 247.80 | 23.6 | 1 | |
| 9 | ∞ | 12.0 | 1.4350 | Quartz |
| 10 | ∞ | | 1 | |

While there are shown and described present preferred embodiments of the invention, it is to be distinctly understood that the invention is not limited thereto, but may be otherwise variously embodied and practiced within the scope of the following claims.

Accordingly, what I claim is:

1. A high speed infrared wide angle lens system with a focal length f, comprising:
   an object side section;
   a middle section;
   a section on the image side;
   said object side section comprising at least one positive lens and one negative lens;
   said middle section comprising at least one positive lens;
   said section on the image side comprising at least one positive lens;
   said at least one positive lens and said one negative lens of said object side section being separated by an air lens; and
   said air lens corresponding to the relation:

$$\frac{1-n}{R} + \frac{n'-1}{R'} < 0$$

wherein:
   R refers to the radius of the object side surface of said air lens;
   n refers to the index of refraction in front of said object side surface of said air lens;
   R' refers to the radius of the image side surface of said air lens; and
   n' refers to the index of refraction behind said image side surface of said air lens; and wherein:
   the overall length of the high speed infrared wide angle lens system defined by a separation between the first and last surface thereof without cover plate is less than 3.1f.

2. The high speed infrared wide angle lens system as defined in claim 1, wherein:
   the overall length of said section on the image side between first and last surfaces of the at least one positive lens on the image side without cover plate is greater than 0.04f.

3. The high speed infrared wide angle lens system as defined in claim 1, wherein:
   each of said lenses has a useful spectral bandpass in at least one wavelength region of the infrared spectrum.

4. The high speed infrared wide angle lens system as defined in claim 2, wherein:
   said high speed infrared wide angle lens system has the following design data for a wavelength of 2.3254 μm:

| Face No. | f = 100.0 Radius R | Thickness D | 2w = 56 degrees Index n | Material |
|---|---|---|---|---|
| 1 | 106.07 | 12.0 | 1.7963 | IRG3 (Schott) |
| 2 | 313.83 | 9.1 | 1 | |
| 3 | −289.43 | 7.0 | 1.4329 | Quartz |
| 4 | 150.88 | 14.1 | 1 | |
| 5 | −128.55 | 6.5 | 1.4329 | Quartz |
| 6 | 130.71 | 9.0 | 1 | |
| 7 | 1886.94 | 12.0 | 1.7963 | IRG3 (Schott) |
| 8 | −154.77 | 0.2 | 1 | |
| 9 | 111.32 | 20.0 | 1.7963 | IRG3 (Schott) |
| 10 | ∞ | 45.1 | 1 | |
| 11 | 146.75 | 24.0 | 1.7963 | IRG3 (Schott) |
| 12 | −205.99 | 6.8 | 1 | |
| 13 | −111.58 | 7.6 | 1.4329 | Quartz |
| 14 | 199.37 | 14.7 | 1 | |
| 15 | ∞ | 6.4 | 1.4329 | Quartz |
| 16 | ∞ | | 1 | | and wherein:
   f = Focal Length;
   F = Lens Speed;
   w = Field Angle; and
   n = Index of Refraction.

5. The high speed infrared wide angle lens system as defined in claim 2, wherein:
   said high speed infrared wide angle lens system has the following design data for a wavelength of 2.2 μm:

| Face No. | f = 200.0 Radius R | Thickness D | 2w = 60 degrees Index n | Material |
|---|---|---|---|---|
| 1 | 318.62 | 15.0 | 3.4462 | Silicon |
| 2 | 530.78 | 14.0 | 1 | |
| 3 | −1092.26 | 13.0 | 1.4350 | Quartz |
| 4 | 244.85 | 107.9 | 1 | |
| 5 | 331.46 | 16.6 | 3.4462 | Silicon |
| 6 | 606.32 | 103.5 | 1 | |
| 7 | 223.68 | 15.4 | 3.4462 | Silicon |
| 8 | 297.27 | 26.2 | 1 | |
| 9 | −3030.85 | 14.0 | 1.4350 | Quartz |
| 10 | 863.35 | 7.2 | 1 | |
| 11 | ∞ | 12.8 | 1.4350 | Quartz |
| 12 | ∞ | | 1 | | and wherein:
   f = Focal Length;
   F = Lens Speed;
   w = Field Angle; and
   n = Index of Refraction.

6. The high speed infrared wide angle lens system as defined in claim 2, wherein:
   said high speed infrared wide angle lens system has the following design data for a wavelength of 2.15 μm:

| Face No. | f = 200.0 Radius R | Thickness D | 2w = 52 degrees Index n | Material |
|---|---|---|---|---|
| 1 | 240.54 | 14.0 | 3.4477 | Silicon |
| 2 | 372.70 | 24.3 | 1 | |
| 3 | −2632.24 | 13.0 | 1.4358 | Quartz |
| 4 | 150.37 | 84.1 | 1 | |
| 5 | 369.28 | 21.0 | 3.4477 | Silicon |
| 6 | 775.86 | 100.9 | 1 | |
| 7 | 260.93 | 15.5 | 3.4477 | Silicon |
| 8 | 387.46 | 35.2 | 1 | |
| 9 | ∞ | 12.8 | 1.4358 | Quartz |
| 10 | ∞ | | 1 | | and wherein:
   f = Focal Length;
   F = Lens Speed;
   w = Field Angle; and
   n = Index of Refraction.

7. The high speed infrared wide angle lens system as defined in claim 2, wherein:
   said high speed infrared wide angle lens system has the following design data for a wavelength of 2.15 μm:

| Face No. | f = 100.00 Radius R | Thickness D | 2w = 30 degrees Index n | Material |
|---|---|---|---|---|
| 1 | 146.62 | 11.9 | 3.4477 | Silicon |
| 2 | 266.72 | 9.3 | 1 | |
| 3 | ∞ | 5.0 | 1.4358 | Quartz |
| 4 | 77.66 | 88.2 | 1 | |
| 5 | 100.84 | 10.4 | 3.4477 | Silicon |
| 6 | 142.54 | 34.8 | 1 | |
| 7 | 151.52 | 7.4 | 3.4477 | Silicon |
| 8 | 410.47 | 0.4 | 1 | |
| 9 | 473.67 | 5.0 | 1.4358 | Quartz |
| 10 | 113.31 | 6.3 | 1 | |
| 11 | ∞ | 5.0 | 1.4358 | Quartz |
| 12 | ∞ | | 1 | | and wherein:
   f = Focal Length;
   F = Lens Speed;
   w = Field Angle; and
   n = Index of Refraction.

8. The high speed infrared wide angle lens system as defined in claim 2, wherein:
   said high speed infrared wide angle lens system has the following design data for a wavelength of 2.2 μm:

| Face No. | f = 200.0 Radius R | Thickness D | 2w = 40 degrees Index n | Material |
|---|---|---|---|---|
| 1 | 301.16 | 16.0 | 4.0875 | Germanium |
| 2 | 436.75 | 26.7 | 1 | |
| 3 | −2358.79 | 16.0 | 1.4350 | Quartz |
| 4 | 210.08 | 126.8 | 1 | |
| 5 | 244.25 | 16.0 | 4.0875 | Germanium |
| 6 | 341.43 | 89.1 | 1 | |
| 7 | 200.0 | 15.0 | 3.4462 | Silicon |
| 8 | 247.80 | 23.6 | 1 | |
| 9 | ∞ | 12.0 | 1.4350 | Quartz |
| 10 | ∞ | | 1 | | and wherein:
   f = Focal Length;
   F = Lens Speed;
   w = Field Angle; and
   n = Index of Refraction.

* * * * *

UNITED STATES PATENT AND TRADEMARK OFFICE
CERTIFICATE OF CORRECTION

PATENT NO. : 4,738,496

DATED : April 19, 1988

INVENTOR(S) : LUDVIK CANZEK

It is certified that error appears in the above-identified patent and that said Letters Patent is hereby corrected as shown below:

Column 3, line 63:

Table 4, Face No. 3, under Thickness D, please delete "50" and insert --5.0"

Signed and Sealed this

Sixth Day of September, 1988

Attest:

DONALD J. QUIGG

*Attesting Officer*  *Commissioner of Patents and Trademarks*